Patented Aug. 22, 1933

1,923,178

UNITED STATES PATENT OFFICE 1,923,178

HYDROXY ALKYL ETHERS OF TERTIARY AMINES AND PROCESS OF PREPARING SAME

Heinrich Ulrich, Joseph Nuesslein, and Paul Koerding, Ludwigshafen-on-the-Rhine, Germany, assignors to I. G. Farbenindustrie Aktiengesellschaft, Frankfort-on-the-Main, Germany No Drawing. Application March 16, 1931, Serial No. 523,179, and in Germany March 20, 1930.

10 Claims. (Cl. 260—127)

The present invention relates to improvements in the production of dispersing agents.

It is already known that alkylene oxides react with ammonia, primary and secondary amines with the formation of hydroxyalkyl amines. Mono-, di- or trihydroxyalkyl amines are obtained according to the conditions employed. It is also already known that by the action of ethylene chlorhydrin or ethylene oxide on dry tri-hydroxyethyl amine, the corresponding hydroxyethyl ether may be prepared, that is compounds which may have the following structures:—

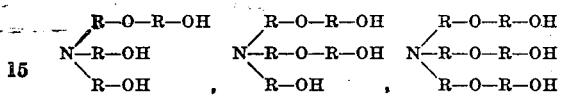

in which R is an ethylene group. Hitherto it has not been possible to prepare these compounds as free bases, however. They have only been isolated in the form of their salts.

We have now found that hydroxy-alkyl ethers of tertiary amines containing hydroxy-alkyl groups are obtained in a simple manner in the form of free bases in a pure state and in good yields by treating ammonia bases containing at least one reactive hydrogen atom, i. e. a hydrogen atom connected to a nitrogen or to an oxygen atom, or to both, such as ammonia or any primary or secondary amines, or primary, secondary or tertiary hydroxy-alkyl amines in the presence of aqueous neutral diluents with alkylene oxides in a quantity at least one molecular proportion above that corresponding to each hydrogen atom connected with a nitrogen atom of the said ammonia bases. The reaction is preferably effected by leading a gaseous alkylene oxide into the solution of ammonia or amines while cooling, the current of gas being regulated so that the speed of supply of the alkylene oxid corresponds to the consumption. The diluents may be chosen from water or aqueous solutions of alcohols which may be further incorporated with water-insoluble solvents such as carbon tetrachloride or other solvents for fats.

The amount of the alkylene oxide should be so measured that the whole of the ammonia or amine present is converted into tertiary hydroxyalkyl amine and that the formation of the desired ether also takes place. For example, at least 4 molecular proportions of alkylene oxide should be used to 1 molecular proportion of ammonia. The temperature is preferably kept between 20° and 30° C., but may be as high as about 100° C. when working with alkylene oxides of sufficiently high boiling point.

It is frequently preferable to start with primary, secondary or tertiary hydroxyalkyl amines and to convert these into the ethers by treatment with a corresponding amount of alkylene oxide in the presence of solvents or diluents. The ethers obtainable according to the present invention are bases having a faint alkaline reaction. They may be obtained in a pure state by fractional distillation in vacuo after removal of water.

The new compounds obtainable in accordance with the present invention correspond to the general formula

in which X is $-(R-O)_n-R_1-OH$, R and $R_1$ being the same or different alkalyene radicles and $n$ being any integral number, Y is an alkyl or cyclo-alkyl radicle or the same as X, and Z is a cycloalkyl or alkylol radicle or the same as X.

The hydroxy-alkyl ethers of aliphatic or mixed open chain aliphatic cycloaliphatic amines which contain one or more hydroxyalkyl groups, obtainable according to the present invention, and also their salts are valuable dispersing agents and considerably assist the treatment and improvement of fibrous materials, such as, for example, of vegetable and animal fibrous materials, such as the treatment of textiles or leather with aqueous preparations or baths and the production of preparations for these purposes, such as, for example, the dissolution or colloidal dispersion of dyestuffs, fats, oils, waxes, resins, cellulose esters and other materials suitable for improving textiles, such as yarns or webs, and leather by dyeing, impregnating, sizing, oiling and similar processes. Depending on the nature of the materials with which the textiles and the like are to be treated, solutions, suspensions or emulsions can be prepared. For washing or scouring the ethers may be employed as such or in the form of their salts, especially with the higher members of the fatty acid series, and other dispersing, emulsifying, wetting and/or cleansing substances, such as soaps, Turkey red oils, salts, esters, amides or ester-amides of alkylol amines with fatty acids, sulphonated fatty acids or sulphonic acids of aromatic or aliphatic compounds, or such sulphonation products themselves may be added as well as their salts and/or organic solvents, soluble or insoluble in water or several of these substances. The emulsions, for example of lubricating oils, may be also employed as drill oils or drill greases and the suspensions of solid materials, such as water-insoluble dyestuffs or pigments may be employed as printing inks.

Since the said bases and also their salts are readily soluble in water, they are especially suitable in all cases in which a thorough wetting or penetration of materials, as for example of textile fibres, by baths is to be promoted. Moreover, they themselves, also their aqueous solutions, have a good solvent power for many organic substances.

The employment of the said bases or preparations for the production of printing pastes or dyebaths is also advantageous, since the presence of the bases or their salts especially promotes levelling and thorough dyeing, and prints and dyeings are obtained therewith which are generally speaking distinguished by clarity and depth. As bases of the said kind may be mentioned hydroxyethers of triethanol amine or tributanol amine, hydroxyethylmorpholine, ethers of two molecules of mono-alkylol amines and the like. The products are generally speaking distinguished in that the basic character is more strongly suppressed and the solvent properties are better than with the simple hydroxy-alkyl amines.

The following examples will further illustrate the nature of this invention, but the invention is not restricted to these examples. The parts are by weight.

*Example 1*

1320 parts of ethylene oxide are slowly led into 500 parts of 20 per cent aqueous ammonia at about 30° C. When the whole has been introduced, the temperature is continuously raised to 40° C. in order to complete the reaction. The water is then removed, preferably in vacuo, and the residue is subjected to vacuum distillation. Mono-, di- and tri-hydroxyethyl ethers of tri-hydroxyethyl amine are obtained in good yields in the ratio of about 3:1:1. They are weakly basic, almost odourless, viscous oils which dissolve readily in water and methyl alcohol and other alcohols. Their boiling temperatures at 2 millimetres mercury gauge are: mono-hydroxyethyl ether of tri-hydroxyethyl amine—from 175° to 185° C.; di-hydroxyethyl ether of tri-hydroxyethyl amine—from 195° to 205°; tri-hydroxyethyl ether of tri-hydroxyethylamine from 210° to 220° C.

*Example 2*

1000 parts of β-ethyl-hexylamine are stirred into 500 parts of water and 1000 parts of ethylene oxide are introduced at about 20° C.; the reaction is completed by warming to 30° or even to 50° C. The water is then distilled off and the product is distilled in vacuo. Besides N, N-di-hydroxyethyl-N-β-ethyl-hexylamine there is obtained the mono-hydroxyethyl ether of this amine which is a yellowish oil, which boils at 210° C. at 20 millimetres (mercury gauge) and which corresponds to the formula

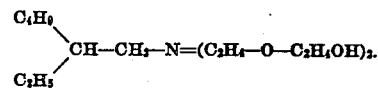

*Example 3*

1000 parts of β-ethyl-hexylamine are stirred into 500 parts of water and 1800 parts of ethylene oxide are introduced at from 10 to 20° C. whereupon the reaction mixture is stirred for 1 hour at from 50° to 55° C. On distilling the reaction product, water passes over at first and then N, N-di-hydroxyethyl-N-β-ethyl-hexylamine, its mono-hydroxyethyl ether and its dihydroxyethyl ether which latter boils at from 235° to 240° C. at 9 millimetres (mercury gauge), constitutes a yellowish water-soluble oil and corresponds to the formula $$\begin{matrix} C_4H_9 \\ \phantom{C_4H_9}\diagdown \\ \phantom{CC}CH-CH_2-N=(C_2H_4-O-C_2H_4OH)_2. \\ \phantom{C_4H_9}\diagup \\ C_2H_5 \end{matrix}$$

*Example 4*

500 parts of triethanolamine are dissolved in about 500 parts of water and 250 parts of gaseous propylene oxide are introduced into the solution at from 20° to 30° C. After the reaction, the water is distilled off and the crude reaction product is distilled in vacuo. Besides small quantities of unaltered triethanolamine, the mono-hydroxypropyl ether of triethanolamine having a boiling point of from 210° to 220° C. at 12 millimetres (mercury gauge) is obtained together with the di-hydroxy propyl ether of triethanolamine having a boiling point of from 230° to 250° C. at 12 millimetres (mercury gauge).

*Example 5*

120 parts of gaseous ethylene oxide are introduced at about 30° C. into a solution of 360 parts of N-cyclohexyl-N, N-di-ethanol amine in 500 parts of water. For completing the reaction the reaction product is slowly heated to 40° C. whereupon the water is distilled off. By distillation in vacuo the mono-hydroxy-ethyl ether of N-cyclohexyl diethanolamine is obtained, which has a boiling point of from 200° to 230° C. at 10 millimetres of mercury and corresponds to the formula

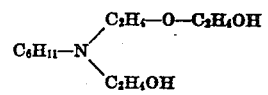

together with the di-hydroxy-ethyl ether having a boiling point of from 240° to 260° C. at 12 millimetres of mercury and corresponding to the formula $C_6H_{11}-N=(C_2H_4-O-C_2H_4OH)_2$. If 360 parts, or more, of ethylene oxide be employed, a polyhydroxyethyl ether is obtained, which cannot be distilled without partial decomposition and is presumably a mixture containing a compound which corresponds to the formula

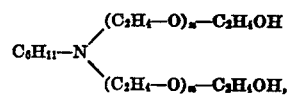

$n$ being an integral number.

*Example 6*

180 parts of ethylene oxide are introduced at about 25° C. into a suspension of 260 parts of dibutyl amine in 250 parts of water. As soon as the main quantity of ethylene oxide has been introduced, the temperature is allowed to rise to about 50° C. After the reaction has been completed, the water is distilled off and the reaction product is distilled in vacuo. The hydroxyethyl ether of N,N-di-butyl-N-ethanol amine $[(C_4H_9)_2=N-C_2H_4-O-C_2H_4OH]$, having a boiling point of from 140° to 160° C at 10 millimetres of mercury, is obtained together with N,N-di-butyl-N-ethanol amine.

Example 7

150 parts of butylene oxide are introduced at about 40° C. into a solution of 300 parts of tri-ethanol amine in 150 parts of water. The reaction mixture is then warmed for several hours to about 50° C. whereupon the water is distilled off. By distillation in vauco a good yield of the mono-hydroxy-butyl ether of triethanol amine, having a boiling point of from 200° to 210° C. at 12 millimetres of mercury, is obtained.

Example 8

To each litre of a dyebath for 100 kilograms of woolen piece goods containing 100 grams of wool fast yellow 3G (Colour Index, page 369, right, column 1), 25 grams of Anthraquinone blue SR extra (G. Schultz, Farbstofftabellen 1923, No. 861), 200 grams of Alizarine direct red B, 10 kilograms of Glauber's salt and 4 kilograms of sulphuric acid, is added 1 cubic centimetre of the mono-hydroxyethyl ether of triethanol amine, obtainable according to Example 1. The goods are treated in the bath at about 50° C. and finished off in the usual manner. In this manner satisfactory equal dyeings are obtained without difficulty with the combination of dyestuffs, which without the addition of the said ether is not suitable for mixed shades and which is difficult to level.

Example 9

A dyebath for 100 kilograms of woolen hat bodies is charged with 8 kilograms of Naphthyl-amine black 10B (G. Schultz, Farbstofftabellen 1923, No. 217), 10 kilograms of Glauber's salt, 5 kilograms of acetic acid and 3 kilograms of a di-hydroxyalkyl ether of triethanolamine having the following composition:

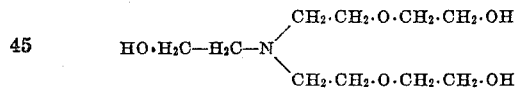

the dyebath is brought rapidly to boiling, the bodies are introduced into the boiling bath, 5 kilograms of sulphuric acid are added in several portions during the course of 30 minutes and the whole is boiled for 1 hour to complete the treatment. In this manner, even with this material which is very difficult to dye thoroughly, well dyed bodies are obtained in a much shorter time than otherwise. By the shortening of the time taken for the dyeing process, a protection of the fibres against attack is effected at the same time.

Example 10

A stripping bath for 100 kilograms of hat bodies from artificial wool at a temperature of from 60° to 70° C. is charged with 4 kilograms of 80 per cent formic acid and 2 kilograms of the N, N-di-hydroxy-ethyl ether of N, N-di-ethanol-N-β-ethyl-hexylamine

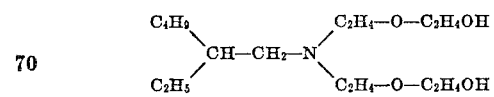

which has preferably been neutralized with oleic acid, oleic sulphonic acid or the sulphonic acid of stearic acid or with Turkey red oil acid or an acid sulphuric ester of cetyl alcohol. The goods are introduced into the bath, 3 kilograms of soluble concentrated zinc formaldehyde sulphoxylate are added, the whole is heated to boiling and boiled for 25 minutes and the goods are then rinsed. An excellent stripping effect is obtained by reason of the excellent solvent power of the ether employed for the dyestuffs and their decomposition products.

Example 11

500 grams of di-hydroxy-ethyl ether of di-ethanol β-ethyl-hexyl amine

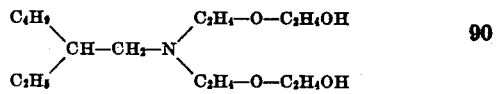

are added to a bucking liquor for 100 kilograms of cotton material. The high solvent power for cotton wax and the good penetrating power of the ether assist the bucking process in an excellent manner and allow the usual time taken for boiling to be reduced by about ⅓ to ½.

Example 12

5 grams of soap and 5 cubic centimetres of the tri-hydroxypropyl ether of tri-ethanol amine (N ≡ CH₂.CH₂.O.CH₂.CH₂.CH₂.OH)₃), obtainable by introducing 180 parts of propylene oxide at 30° C. into a solution of 150 parts of tri-ethanol amine in 100 parts of water or 5 cubic centimetres of the tri-hydroxyethyl ether of tri-propanol amine are added per litre to a washing bath for 100 kilograms of waste wool containing oil and fat, at a temperature of 40° C. The goods are manipulated for half an hour, squeezed out and rinsed. An excellent cleansing of the material is obtained. Instead of the said ammonia derivatives, the products obtainable therefrom by neutralization with fatty acids, such as stearic acid, which have a very high wetting, emulsifying and washing power, may be employed.

Example 13

100 grams of Indanthrene brilliant violet 2R paste (Colour Index, 1924, No. 1104) are printed on cotton with 200 grams of the tri-hydroxy-ethyl ether of tri-ethanol amine, 100 grams of potash and 600 grams of starch-British gum thickening, dried, steamed for 5 minutes in a Mather-Platt apparatus, rinsed, soaped and prepared. Beautiful, clear deep prints are obtained.

Example 14

100 parts of Indanthrene blue RS paste (G. Schultz, Farbstofftabellen, 1923, No. 838) are mixed with 1 part of the mono-hydroxyethyl ether of N-β-ethyl-hexyl-N, N-di-ethanol amine (obtainable according to Example 2), evaporated to dryness and pulverized. The resulting powder, when carefully made into a paste with water, yields a suspension which, as regards the degree of dispersion, is equal in value to the paste employed. The dyestuff powder prepared in this manner has, however, the important advantage, contrasted with the aqueous dyestuff paste, of having a smaller weight for the same amount and degree of dispersion of dyestuff and, moreover, of being stable to cold.

A powder which behaves in a similar manner is obtained in an analogous manner from 100 parts of Indanthrene gold orange G paste (G. Schultz, Farbstofftabellen 1923, No. 760) and 1 part of a mono- or di-ethanol amine hydroxyalkyl ether. The addition of these ethers during grinding to heavy spar, carbon black, lithopone and the like assists the dispersion.

What we claim is:—

1. The process for the production of dispersing agents, which comprises reacting on an ammonia base, containing at least one reactive hydrogen atom, in the presence of an aqueous neutral diluent with at least $n+1$ molecular proportions of an alkylene oxide for each molecular proportion of said base, $n$ being the number of reactive hydrogen atoms in said base.

2. The process for the production of dispersing agents, which comprises reacting on an aliphatic amine, containing at least one reactive hydrogen atom in the presence of water with at least $n+1$ molecular proportions of an alkylene oxide for each molecular proportion of said base, $n$ being the number of reactive hydrogen atoms in said base.

3. The process for the production of dispersing agents, which comprises reacting on a cycloaliphatic amine, containing at least one reactive hydrogen atom in the presence of water with at least $n+1$ molecular proportions of an alkylene oxide for each molecular proportion of said base, $n$ being the number of reactive hydrogen atoms in said base.

4. The process for the production of dispersing agents, which comprises reacting on ammonia in the presence of water with an alkylene oxide in a quantity of at least four molecular proportions of the oxide per each molecular proportion of ammonia.

5. The process for the production of dispersing agents, which comprises reacting on an ammonia base, containing at least one reactive hydrogen atom, in the presence of water with at least $n+1$ molecular proportions of a gaseous alkylene oxide for each molecular proportion of said base, $n$ being the number of reactive hydrogen atoms in said base.

6. The process for the production of dispersing agents, which comprises reacting on an aqueous ethanol amine with at least $n+1$ molecular proportions of a gaseous alkylene oxide for each molecular proportion of said base, $n$ being the number of reactive hydrogen atoms in said base.

7. A hydroxyalkylether of a tertiary amine, corresponding to the general formula

in which X is $-(R-O)_x-R_1OH$, R and $R_1$ being the same or different alkylene radicles and $n$ being any integral number, Y is a cyclohexyl or alkyl radicle, or the same as X and Z is a cyclohexyl or alkylol radicle or the same as X.

8. A hydroxyalkyl ether of a tertiary amine, corresponding to the general formula

in which X are $-C_2H_4O-C_2H_4OH$ and Y and Z is $-C_2H_4OH$ or $C_2H_4O-C_2H_4OH$.

9. An aqueous preparation suitable for the treatment of fibrous materials, comprising a hydroxyalkyl ether of a tertiary amine, corresponding to the general formula

in which X is $-(R-O)_x-R_1OH$, R and $R_1$ being the same or different alkylene radicles and $n$ being any integral number, Y is a cyclohexyl or alkyl radicle, or the same as X and Z is a cyclohexyl or alkylol radicle or the same as X.

10. An aqueous preparation suitable for the treatment of fibrous materials, comprising from 0.1 to 5 per cent by weight of the preparation, of a hydroxyalkyl ether of a tertiary amine, corresponding to the general formula

in which X is $-(R-O)_x-R_1OH$, R and $R_1$ being the same or different alkylene radicles and $n$ being any integral number, Y is a cyclohexyl or alkyl radicle, or the same as X and Z is a cyclohexyl or alkylol radicle or the same as X.

HEINRICH ULRICH.
JOSEPH NUESSLEIN.
PAUL KOERDING.